US012421058B2

(12) United States Patent
Lavoie et al.

(10) Patent No.: US 12,421,058 B2
(45) Date of Patent: Sep. 23, 2025

(54) INTERFACE APPARATUS FOR FORK LIFT AND CONTAINERS

(71) Applicant: MOVEX INNOVATION INC., Shawinigan (CA)

(72) Inventors: Fabien Lavoie, Shawinigan (CA); Alain Hamel, Shawinigan (CA); Carl Paille, Shawinigan (CA); Jean-François Roy, Shawinigan (CA)

(73) Assignee: MOVEX INNOVATION INC., Shawinigan (CA)

( * ) Notice: Subject to any disclaimer, the term of this patent is extended or adjusted under 35 U.S.C. 154(b) by 497 days.

(21) Appl. No.: 17/435,459

(22) PCT Filed: Feb. 28, 2020

(86) PCT No.: PCT/CA2020/050273
§ 371 (c)(1),
(2) Date: Sep. 1, 2021

(87) PCT Pub. No.: WO2020/176979
PCT Pub. Date: Sep. 10, 2020

(65) Prior Publication Data
US 2022/0127087 A1    Apr. 28, 2022

Related U.S. Application Data

(60) Provisional application No. 62/812,486, filed on Mar. 1, 2019.

(51) Int. Cl.
*B65G 65/23*    (2006.01)
*B65F 1/12*     (2006.01)
*B66F 9/19*     (2006.01)

(52) U.S. Cl.
CPC .............. *B65G 65/23* (2013.01); *B65F 1/122* (2013.01); *B66F 9/19* (2013.01)

(58) Field of Classification Search
None
See application file for complete search history.

(56) References Cited

U.S. PATENT DOCUMENTS 5,427,495 A    6/1995   Vlaanderen
10,494,171 B2 * 12/2019 Lavoie ................... B65D 90/14
(Continued)

FOREIGN PATENT DOCUMENTS

CA        2872703 A1    11/2013
WO    2008/038048 A1     4/2008
(Continued)

*Primary Examiner* — Michael S Lowe
(74) *Attorney, Agent, or Firm* — NORTON ROSE FULBRIGHT CANADA LLP

(57) ABSTRACT

An interface apparatus for coupling a vehicle to a container, has: a base engageable by the vehicle; a frame connected to the base and detachably securable to the container, the frame pivotable relative to the base for pivoting the container from a lifting position to a discharging position for discharging the container; an actuation unit between the frame and the base; and a latching mechanism for removably attaching the container to the apparatus, the latching mechanism including a first portion secured to the frame and a second portion securable to the container, the first portion movable relative to the second portion in a mating direction having a component normal to the ground from a disengaged configuration in which the first portion is detached form the second portion to an engaged configuration in which the first portion is received within the second portion.

21 Claims, 8 Drawing Sheets

(56) References Cited

U.S. PATENT DOCUMENTS

| | | | |
|---|---|---|---|
| 10,625,934 B2* | 4/2020 | Mallady | ............... B62B 3/0612 |
| 2009/0297305 A1 | 12/2009 | Autrey | |
| 2015/0023769 A1 | 1/2015 | Oberg | |

FOREIGN PATENT DOCUMENTS

| | | | |
|---|---|---|---|
| WO | 2013/090213 A2 | 6/2013 |
| WO | 2018129316 A1 | 7/2018 |

* cited by examiner

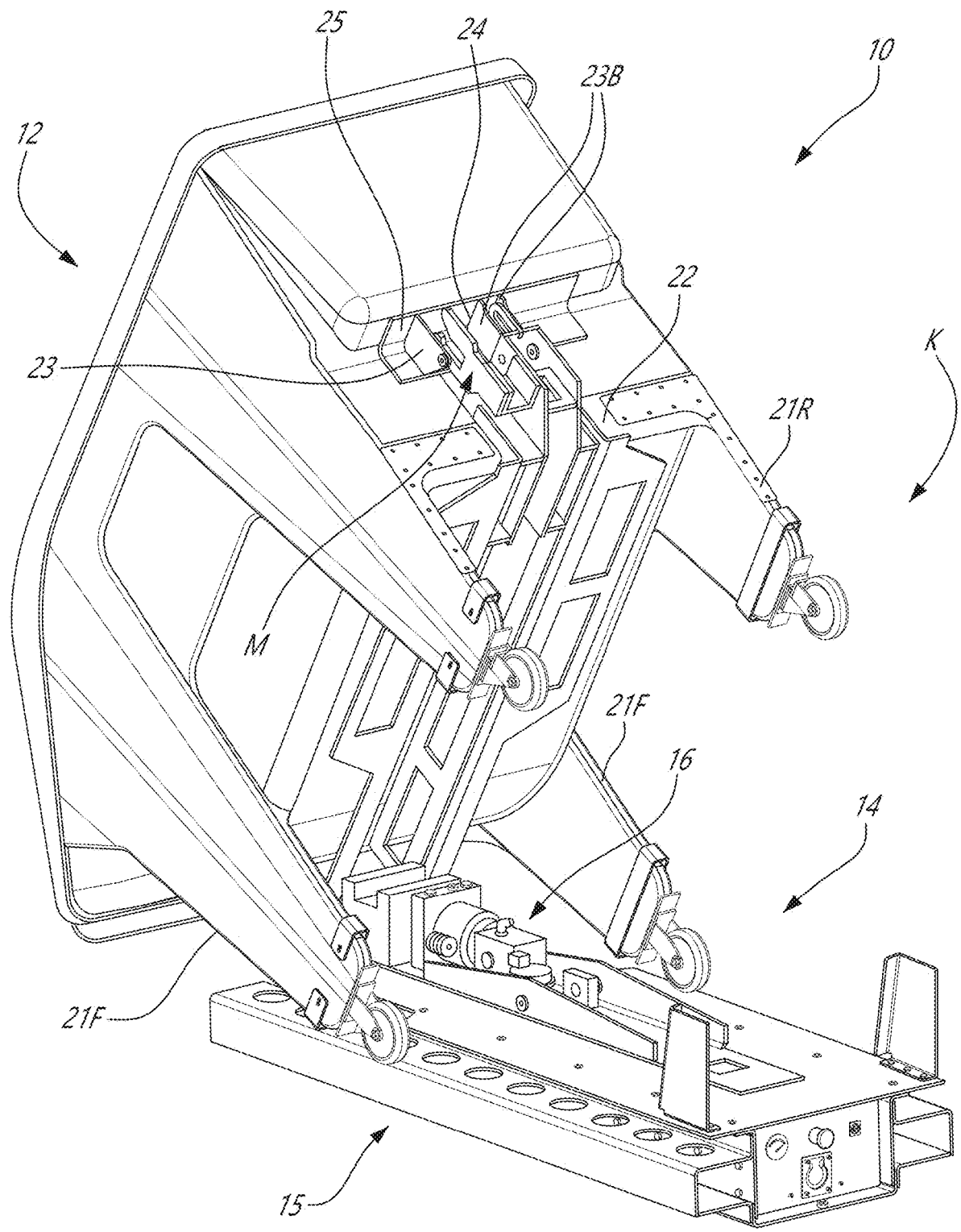

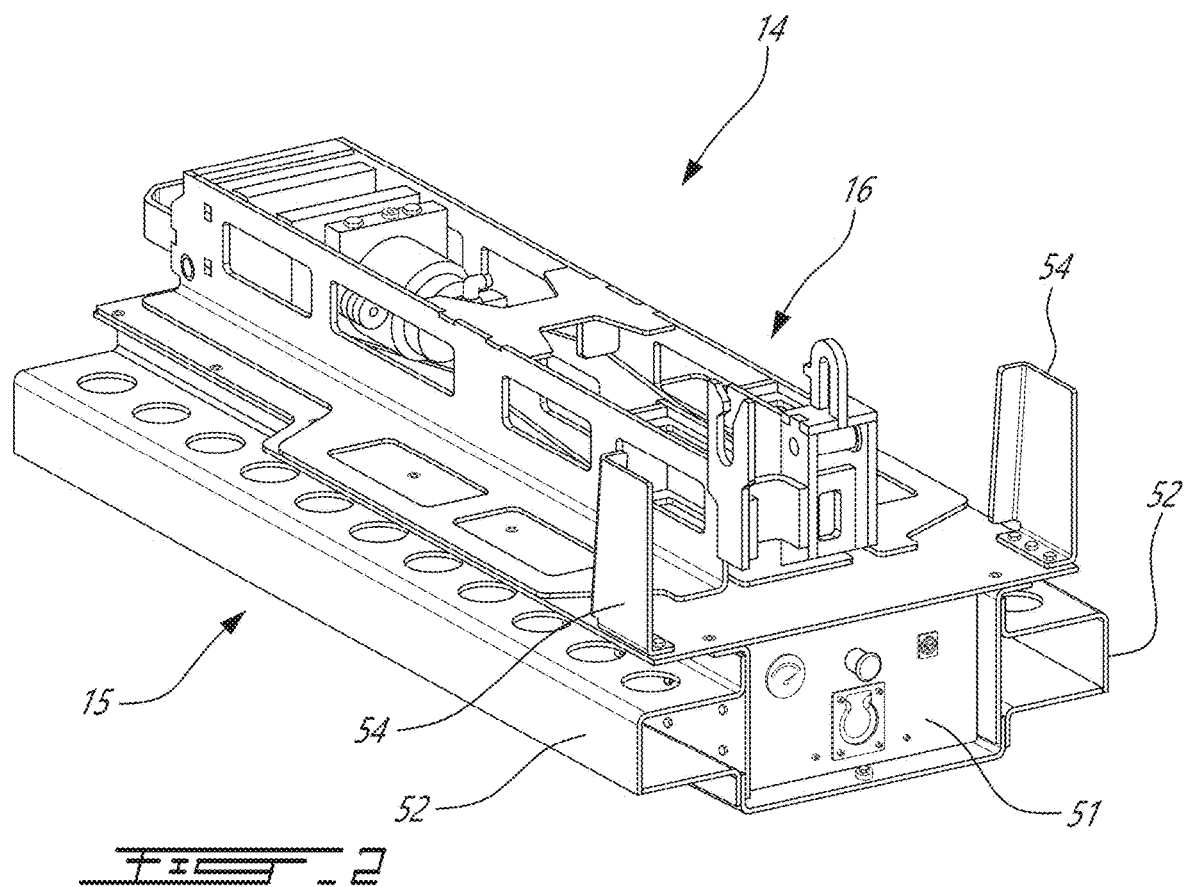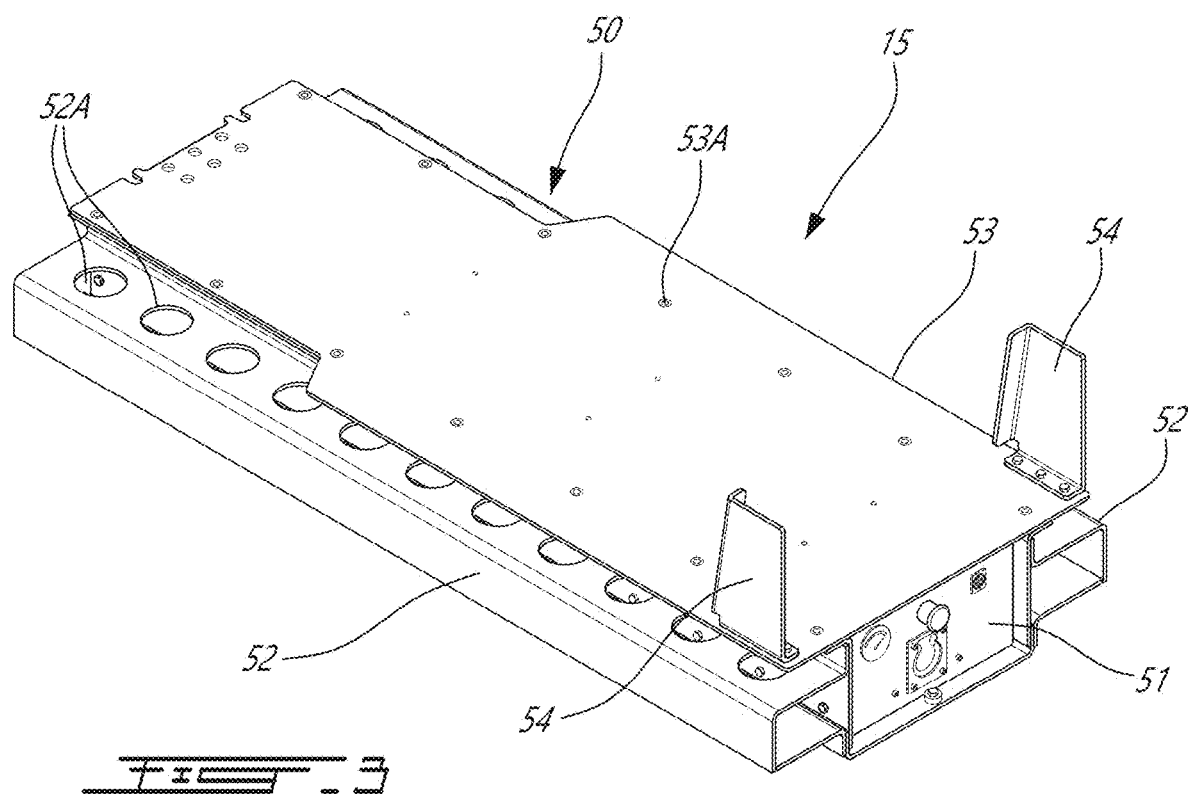

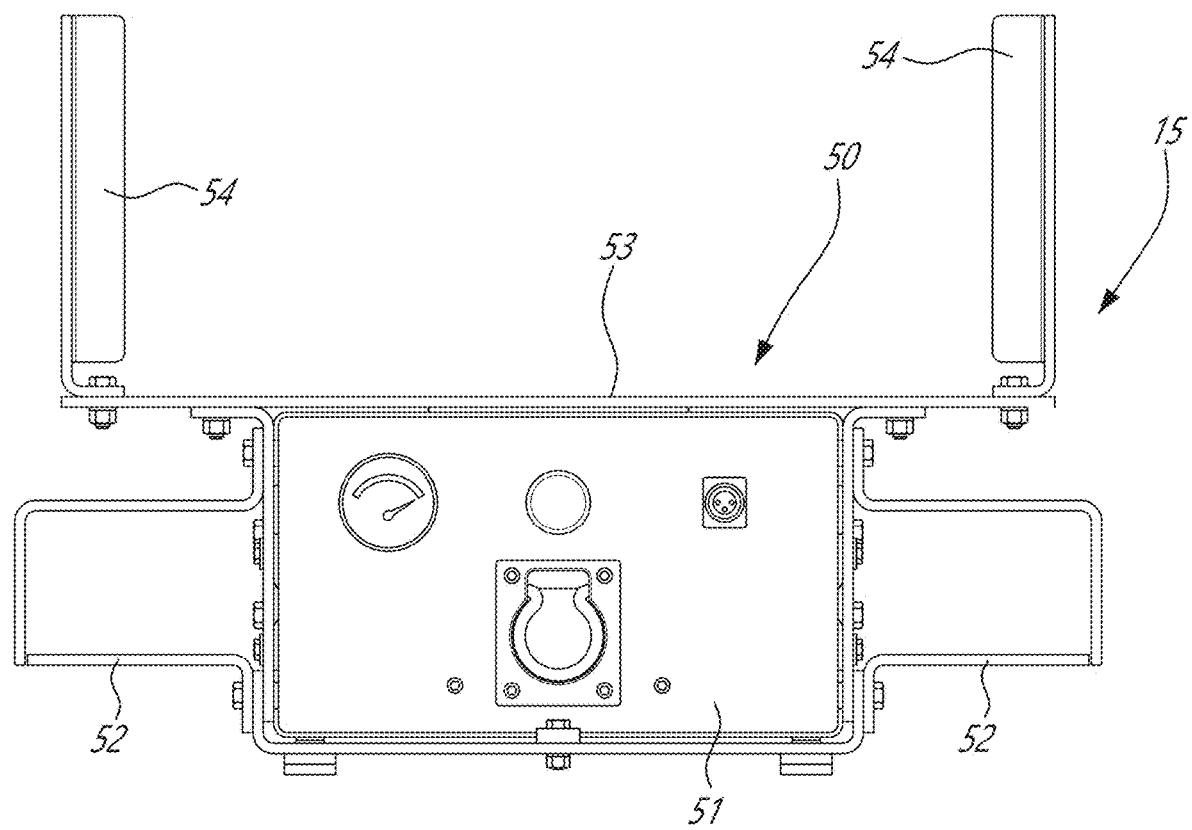

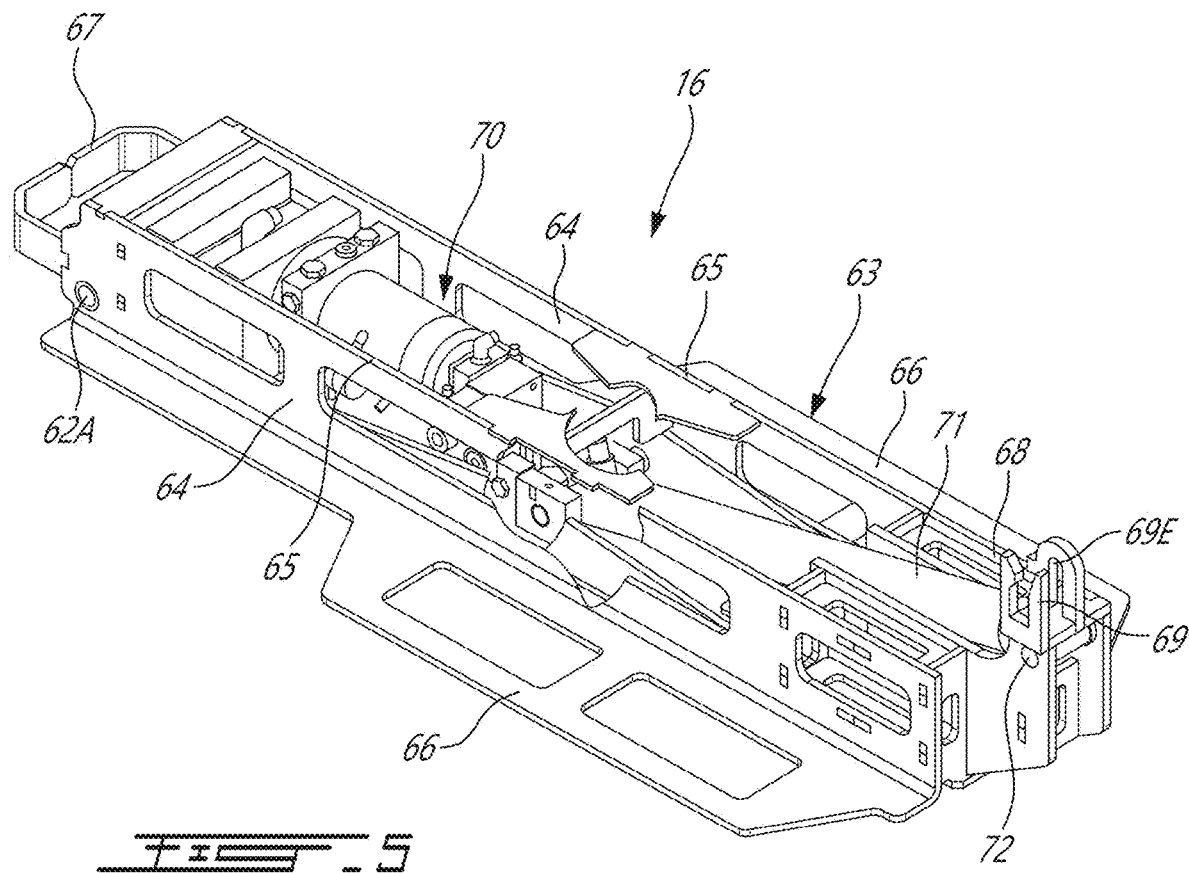
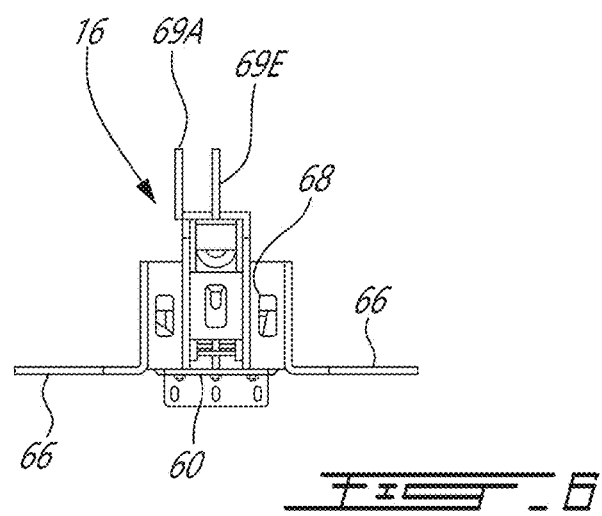

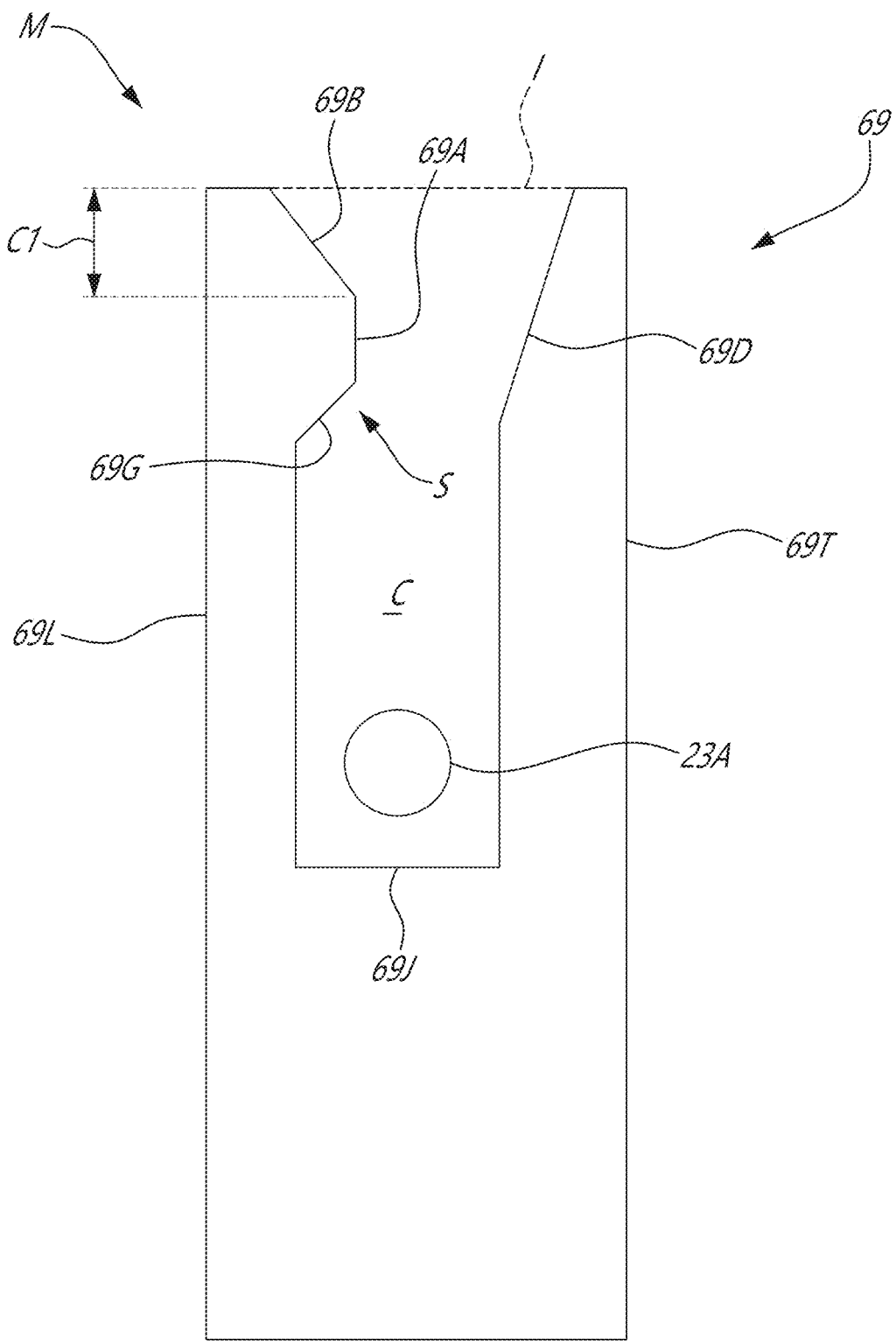

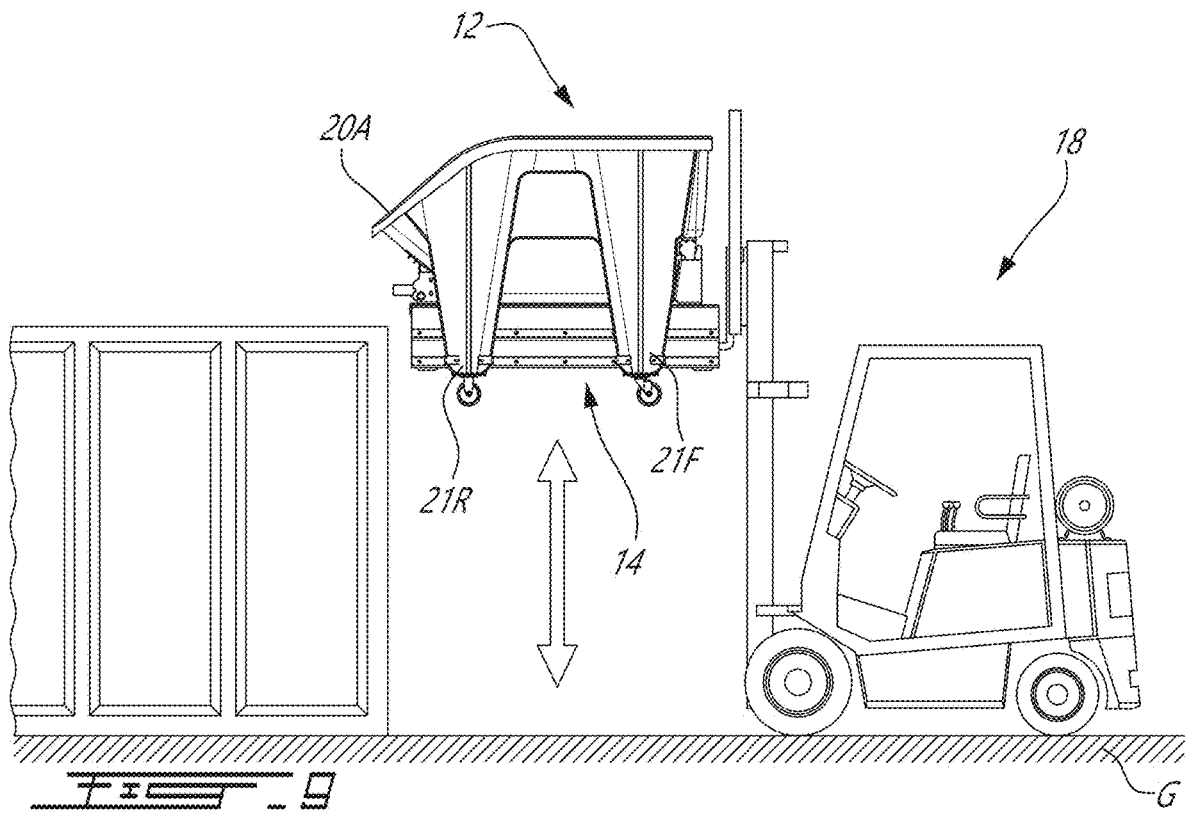
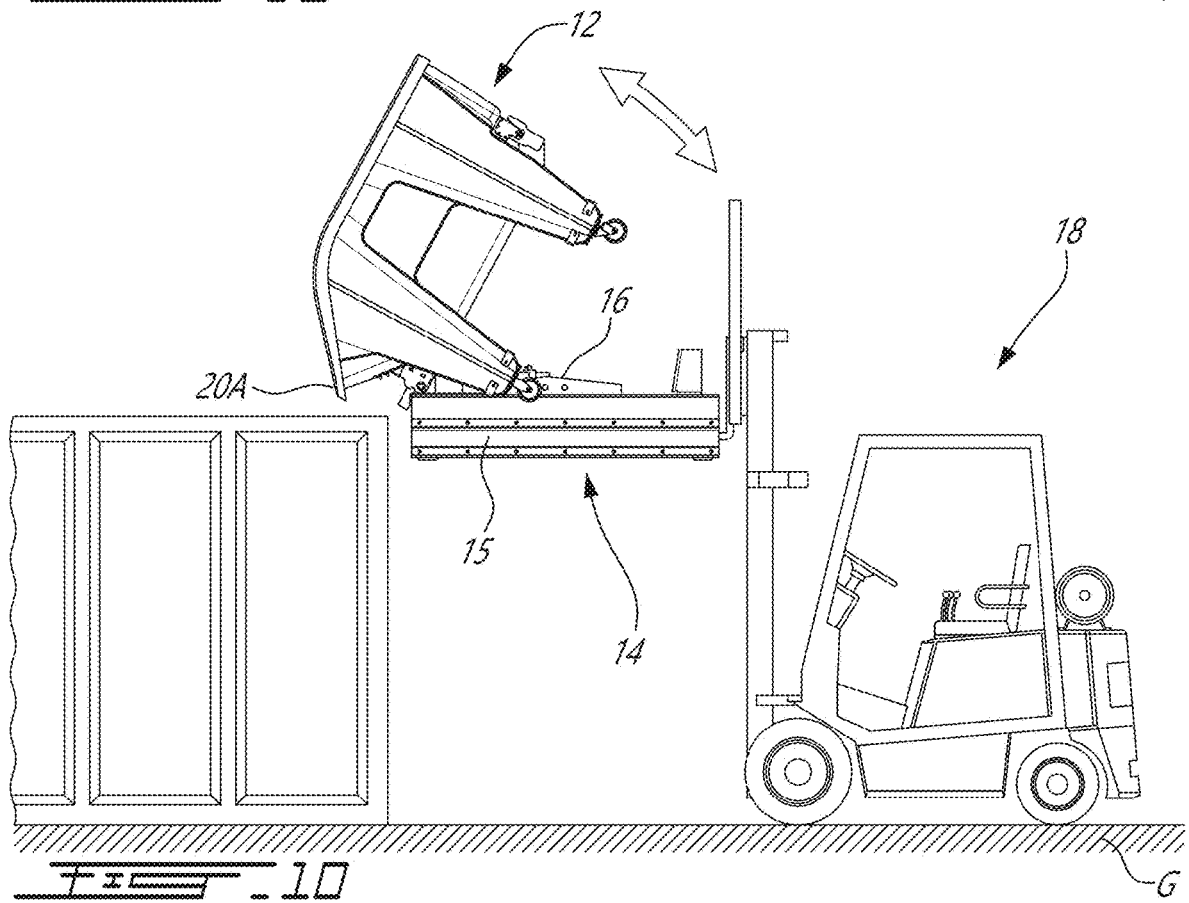

INTERFACE APPARATUS FOR FORK LIFT AND CONTAINERS

CROSS-REFERENCE TO RELATED APPLICATIONS

This application claims priority from U.S. patent application 62/812,486 filed on Mar. 1, 2019. Its content is incorporated herewith in its entirety by reference.

TECHNICAL FIELD

The present application relates to an interface apparatus for interfacing containers such as bins, bulk-material containers, waste disposal units, of relatively large size, to a vehicle, such as a fork lift, during maneuvers.

BACKGROUND OF THE ART

It is often required to employ relatively large containers for various uses: waste disposal, storage and transport of materials such as bulk material, etc. However, such large containers are difficult to maneuver, and have consequently been provided with casters. A common task is to raise such waste containers, to empty their contents in large garbage bins, such as dumpsters, skip bins, or like industrial size waste containers. However, due to the shape of forklifts, the raising and tilting of such garbage bins may be hazardous.

BRIEF SUMMARY

In accordance with a first embodiment, there is provided an interface apparatus for coupling a vehicle to a container, comprising: a base engageable by the vehicle; a frame connected to the base and detachably securable to the container, the frame pivotable relative to the base for pivoting the container from a lifting position for maintaining the container leveled relative to a ground to a discharging position in which the container is angled relative to the ground for discharging the container; an actuation unit between the frame and the base for pivoting the frame relative to the base; and a latching mechanism for removably attaching the container to the apparatus, the latching mechanism including a first portion secured to the frame and a second portion securable to the container, the first portion movable relative to the second portion in a mating direction having a component normal to the ground from a disengaged configuration in which the first portion is detached form the second portion to an engaged configuration in which the first portion is received within the second portion.

Still in accordance with the first embodiment, one of the first portion and the second portion defines a channel for receiving the other of the first portion and the second portion, the channel being oriented at least partially vertically relative to the ground.

Still in accordance with the first embodiment, the channel defines an inlet for receiving the other of the first portion and the second portion, the channel defining a converging section extending form the inlet for guiding the other of the first portion and the second portion from the disengaged configuration to the engaged configuration.

Still in accordance with the first embodiment, one of the first portion and the second portion defines a stopper in abutment against the other of the first portion and the second portion in the discharging position.

Still in accordance with the first embodiment, the first portion has two prongs defining a groove therebetween, the groove having an opening oriented away from the ground, and wherein the second portion is a rod extending perpendicularly to the groove and slidingly receivable within the groove in the mating direction.

Still in accordance with the first embodiment, a lateral stopper is secured to a distal end of the rod, the stopper defining an abutment face, the abutment face being abuttable against one or more of the two prongs in the engaged configuration of the latching mechanism.

Still in accordance with the first embodiment, the two prongs include a leading prong and an trailing prong, a tooth defined by the leading prong and protruding toward the trailing prong, the tooth defining a tooth abutment face oriented at least partially toward a bottom of the groove.

Still in accordance with the first embodiment, the tooth abutment face is substantially perpendicular to the ground upon the frame being in the discharging position for limiting movements of the container relative to the frame in the discharging position.

Still in accordance with the first embodiment, the tooth defines a guiding face opposite the abutment face, the guiding face sloping toward the trailing prong and toward the bottom of the groove.

Still in accordance with the first embodiment, the trailing prong defines a second guiding face sloping toward the leading prong and toward the bottom of the groove.

Still in accordance with the first embodiment, the actuation unit is a linear actuator.

Still in accordance with the first embodiment, each of the frame and the container defines an aperture, the apertures being in register upon the locking mechanism in the engaged configuration, a pin removably insertable through both of the apertures to lock the frame to the container.

In accordance with a second embodiment, there is provided a kit comprising: a container defining an engagement surface facing a ground; and an interface apparatus having a base engageable by a vehicle for lifting the interface apparatus and the container off the ground, a frame connected to the base and detachably securable to the container, the frame abuttable against the engagement surface of the container, the frame pivotable relative to the base from a lifting position in which the container is leveled relative to the ground to a discharging position in which the container is angled relative to the ground for discharging the container, an actuation unit engaged to the frame and the base for pivoting the frame relative to the base, and a latching mechanism for removably attaching the container to the apparatus, the latching mechanism including a first portion secured to the frame and a second portion defined by the container, the first portion movable relative to the second portion in a mating direction having a component normal to the ground from a disengaged configuration in which the first portion is detached form the second portion to an engaged configuration in which the first portion is received within the second portion.

Still in accordance with the second embodiment, one of the first portion and the second portion defines a channel for receiving the other of the first portion and the second portion, the channel being oriented at least partially vertically relative to the ground.

Still in accordance with the second embodiment, the channel defines an inlet for receiving the other of the first portion and the second portion, the channel defining a converging section extending form the inlet for guiding the other of the first portion and the second portion from the disengaged configuration to the engaged configuration.

Still in accordance with the second embodiment, one of the first portion and the second portion defines a stopper in abutment against the other of the first portion and the second portion in the discharging position.

Still in accordance with the second embodiment, the first portion has two prongs defining a groove therebetween, the groove having an opening oriented away from the ground, and wherein the second portion is a rod extending perpendicularly to the groove and slidingly receivable within the groove in the mating direction.

Still in accordance with the second embodiment, a lateral stopper is secured to a distal end of the rod, the stopper defining an abutment face, the abutment face being abuttable against one or more of the two prongs in the engaged configuration of the latching mechanism.

Still in accordance with the second embodiment, the two prongs include a leading prong and an trailing prong, a tooth protruding from the leading prong toward the trailing prong, the tooth defining a tooth abutment face oriented at least partially toward a bottom of the groove.

Still in accordance with the second embodiment, the tooth abutment face is substantially perpendicular to the ground upon the frame being in the discharging position for limiting movements of the container relative to the frame in the discharging position.

Still in accordance with the second embodiment, the tooth defines a guiding face opposite the abutment face, the guiding face sloping toward the trailing prong and toward the bottom of the groove.

Still in accordance with the second embodiment, the trailing prong defines a second guiding face sloping toward the leading prong and toward the bottom of the groove.

Still in accordance with the second embodiment, the actuation unit is a linear actuator.

Still in accordance with the second embodiment, each of the frame and the container defines an aperture, the apertures being in register upon the locking mechanism in the engaged configuration, a pin removably insertable through both of the apertures to lock the frame to the container.

In accordance with a third embodiment, there is provided method of operating an interface apparatus having base engageable by a vehicle and frame detachably securable to a container and pivotable relative to the base, comprising: coupling the vehicle to the base of the interface apparatus; locking the frame of the interface apparatus to the container by lifting the interface apparatus off the ground; and discharging a content of the container by pivoting the frame and the container secured thereto relative to the base.

Still in accordance with the third embodiment, the method further comprises lifting both of the container and the interface apparatus off the ground before discharging the content of the container.

Still in accordance with the third embodiment, coupling the vehicle includes inserting each of two forks of the vehicle in a respective one of rails defined by the base of the interface apparatus.

Still in accordance with the third embodiment, locking the frame to the container includes inserting a rod defined by one of the frame and the container into a groove defined by the other of the frame and the container.

Still in accordance with the third embodiment, discharging the content of the container includes blocking the rod within the groove.

Still in accordance with the third embodiment, locking the frame to the container includes limiting lateral movements of the container relative to the interface apparatus.

Still in accordance with the third embodiment, the method further comprises disengaging the frame from the container.

32 Still in accordance with the third embodiment, the method further comprises guiding the rod out of the groove while disengaging the frame from the container.

Still in accordance with the third embodiment, the method further comprises disengaging the frame from the container by moving the interface apparatus relative to the container toward the ground.

Still in accordance with the third embodiment, moving the interface apparatus relative to the container includes laying the container on the ground and moving the interface apparatus toward the ground.

In accordance with a fourth embodiment, there is provided a system of an interface apparatus and container, comprising a container having a receptacle on legs, the receptacle on legs defining an under volume, the container having a container connector; and an interface apparatus including a structure adapted to be supported by a fork of a vehicle, and a device with a frame positioned over the vehicle and connected to the base with at least a rotational joint adjacent to a leading end of the lift interface device, such that the frame is movable from a coupling orientation to a raised orientation, an actuation unit to rotate and hold the frame relative to the base at desired orientations between the coupling orientation and the raised orientation, the frame comprising at least one support surface for supporting the container when the frame is rotated toward the raised configuration, and an interface connector at a trailing end of the device adapted to be used for releasably connecting the container to the frame when the frame is rotated toward the raised configuration, the interface connector having a portion located closer to the leading end than a portion of the container connector to block movement of the container when the frame is rotated away from the coupling orientation.

BRIEF DESCRIPTION OF THE DRAWINGS

FIG. 1 is a perspective view of a container system including an interface apparatus with a container thereon, in accordance with the present disclosure of the present disclosure;

FIG. 2 is a perspective view of the interface apparatus of FIG. 1;

FIG. 3 is a perspective view of an interface structure of the interface apparatus of FIG. 2;

FIG. 4 is a rear elevational view of the interface structure of FIG. 3;

FIG. 5 is a perspective view of a lift interface device of the interface apparatus of FIG. 2;

FIG. 6 is a rear elevational view of the lift interface device of FIG. 5;

FIG. 8C is a schematic cross-sectional view of a female connector of the latching mechanism of FIG. 8A;

FIG. 9 is a side view showing the interface apparatus of FIG. 2 interfacing the vehicle to the container, during vertical movement; and FIG. 10 is a side view showing the interface apparatus of FIG. 2 interfacing the vehicle to the container, during tilting movement.

DETAILED DESCRIPTION

Figure 7A:
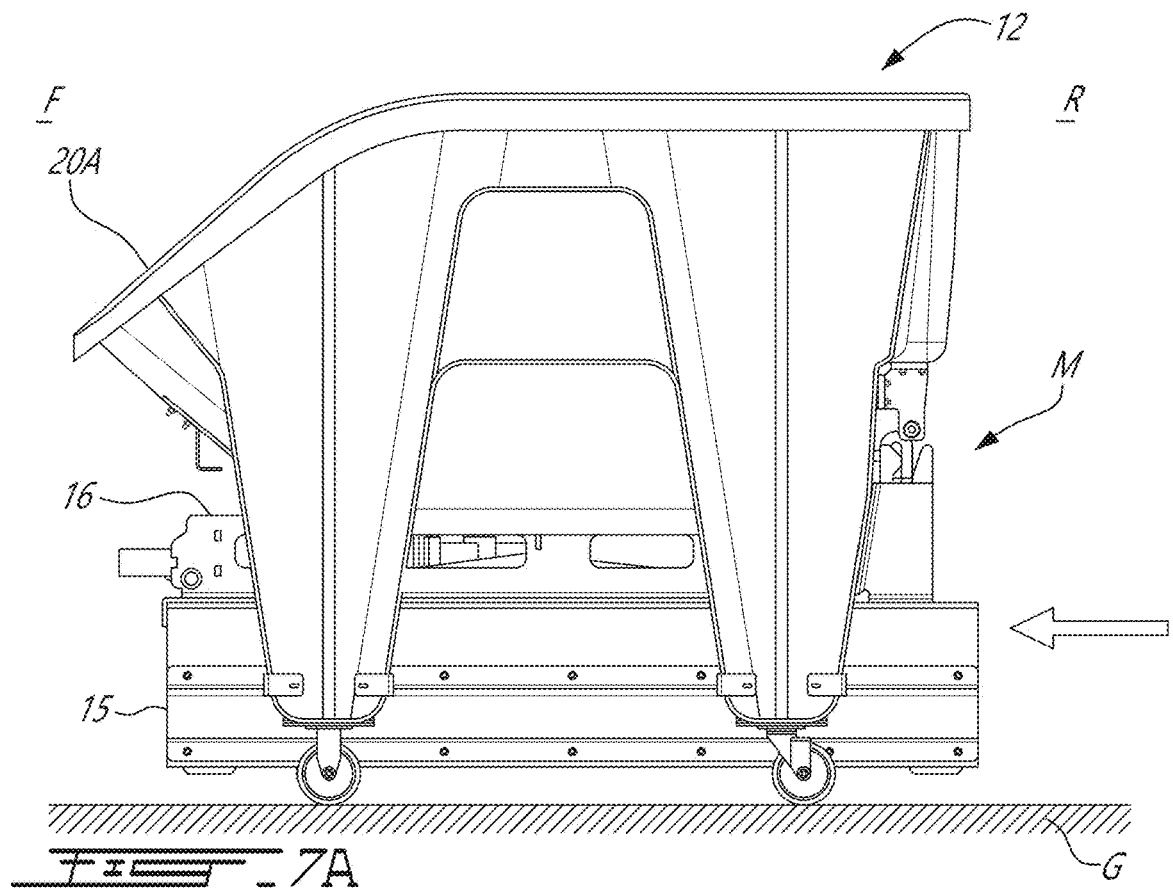
FIG. 7A is a side view showing the interface apparatus being positioned under the container.

Referring to the drawings, and more particularly to FIGS. 1 and 9-10, a system in accordance with an embodiment of the present disclosure is generally shown at 10. The system 10 comprises one or numerous containers 12, an interface apparatus or device 14 including an interface structure, also referred to as a base, 15 and a lift interface device 16, for manipulation of the containers 12 with a vehicle 18 such as a forklift.

The container 12 may be any type of container, receptacle, bin, waste disposal unit, pallet, table or the like that is used to carry materials such as waste, construction materials in bulk or packaged format, etc, or equipment. The container 12 may have shelves or any appropriate configuration as a function of its use. The container 12 may also have casters. The container 12 may be made of any appropriate materials, such as plastics and/or metals. In an embodiment, the container 12 is made of a molded plastic, such as polyethylene. In the figures, components of the container 12 are in the 20s (e.g., 20, 21, etc).

The interface apparatus 14 is used as an interface between the container 12 and the vehicle 18, for the container 12 to be maneuvered by the vehicle 18. The maneuvering may include the displacement of the container 12, raising the container 12 and/or tilting the container to empty it from its contents (e.g., waste, debris, bulk materials, etc). In other words, the interface apparatus 14 is operable in a lifting position depicted in FIG. 9 and a discharging position depicted in FIG. 10. In the lifting position, the interface apparatus 14 and the container 12 supported thereon are substantially leveled relative to a ground G whereas, in the discharging position, the container 12 is angled relative to the ground G for discharging the container 12.

The interface structure 15 is a structural components of the interface apparatus 14 and will be in direct contact with the vehicle 18. In the figures, components of the interface structure 15 are in the 50s (e.g., 50, 51, etc).

The lift interface device 16 is on the interface structure 50 and is used to interface and connect the container 12 to the interface apparatus 14. The lift interface device 16 may be actuated to tilt the container 12, to a discharge orientation, as in FIG. 10. In the figures, components of the lift interface device 16 are in the 60s and 70s (e.g., 60, 61, . . . , 70, 71, etc).

The vehicle 18 is used to carry containers 12. The vehicle 18 may be a fork lift, as known as a forklift, forklift truck. The fork lift 18 may conventionally have a pair of forks, having generally horizontal portions, and connected to carriage that may move in translation on a mast, so as to raise or lower the forks and a load on the forks. For example, the load may be a filled container 12.

Referring concurrently to FIGS. 1, 7A, 7B, 8A, 8B, 9 and 10, the container 12 has a receptacle portion 20 supported by legs 21 that may or may not have casters (the casters being shown in the figures). Reference is made hereinafter to the front and the rear of the container 12 interface apparatus 14 and of the system 10. The front is the leading end of the container 12 relative to the vehicle 18. The rear of the container 12 is thus the closest to the vehicle 18. The front legs 21 are labeled as 21F in the figures while the rear legs are labeled as legs 21R. The legs 21 raise the receptacle portion 20 such that an undersurface of the receptacle portion 20 is spaced from the ground, thereby defining a tunnel (i.e., passage) for the interface apparatus 14 to be inserted thereunder.

As shown in FIG. 1, the container 12 may have a channel 22 defined in the undersurface of the receptacle portion 20. If present, the channel 22 may be open-ended at both ends, or open-ended at a single end. The channel 22 is centrally located in the receptacle portion, and may extend from the front to the rear of the container 12.

Despite the receptacle portion 20 being shown as having a relatively high sidewall, the receptacle portion 20 may be of smaller volume to limit the volume of material it can accommodate (to avoid overloading). A load cell may be in the interface apparatus 14 and/or on the vehicle 18 to weigh the material received in the receptacle portion 20. It is observed that the receptacle 20 is open-ended with a front spout portion 20A (FIGS. 9 and 10), among numerous other design possibilities. Moreover, the cavity of the receptacle portion 20 may flare slightly towards the open top. Accordingly, in an example, containers 12 may be stacked into one another.

Figure 8A:
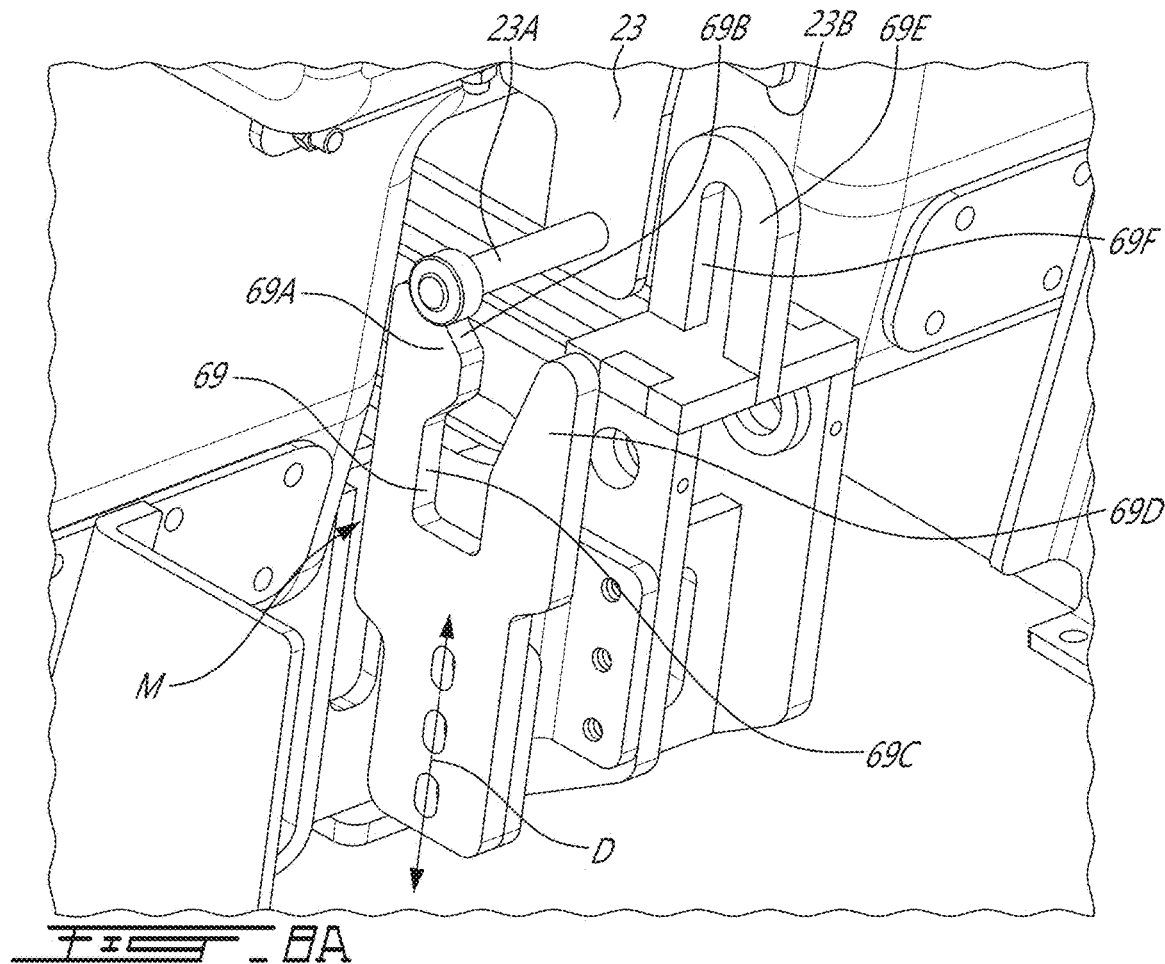
FIG. 8A is an enlarged perspective view showing the connectors of the interface apparatus and of the container prior to engagement.
Figure 8B:
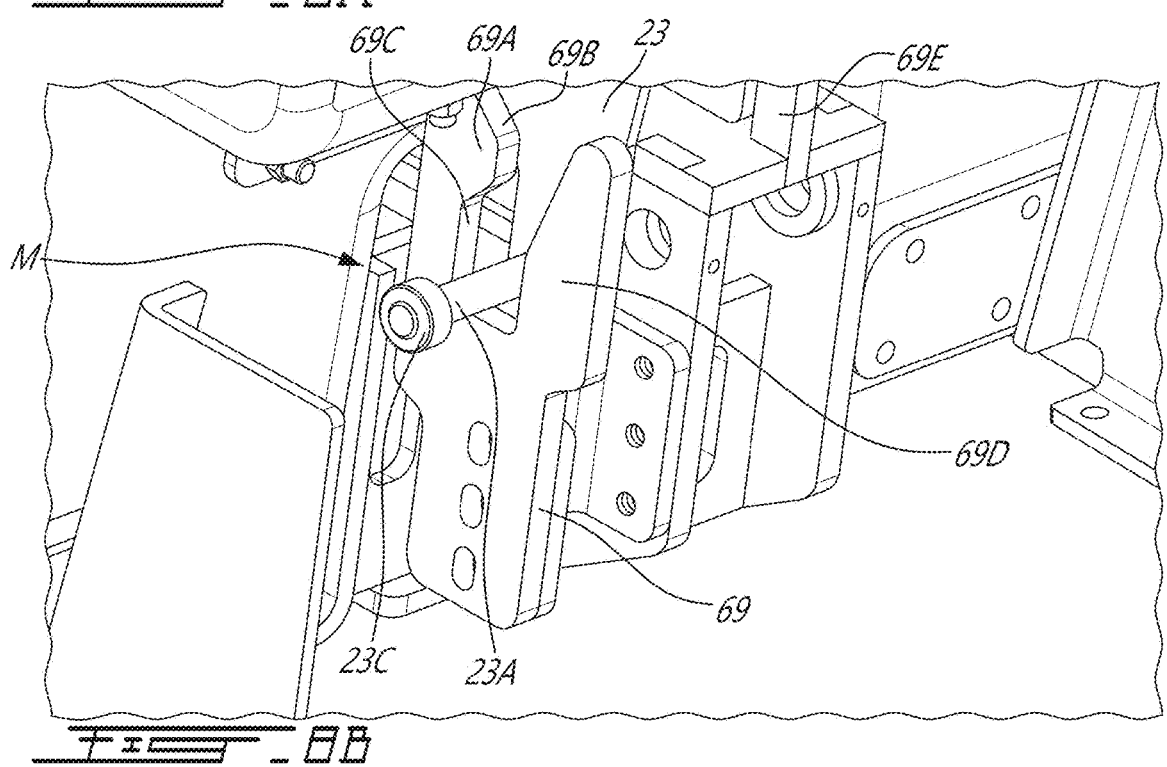
FIG. 8B is an enlarged perspective view showing the connectors of the interface apparatus and of the container after engagement.

As observed from FIGS. 1, 9 and 10, the interface apparatus 14 is positioned under the container 12. As best seen in FIGS. 8A and 8B, the container 12 has a male connector 23 with rod 23A adjacent to the rear legs 21R. The rod 23A is shown as being transverse to a remainder of the male connector 23, with a head 23C at its end. Other embodiments are contemplated as well. The container 12 may also have a pair of connector tabs 23B. Although a pair of the connector tabs 23B are shown a single connector tab 23B could be used to connect the container 12 to the lift interface device 16, as described hereinafter.

The male connector 23 and connector tabs 23B typically include reinforced or robust walls capable of sustaining pressures associated with loaded containers 12. The connector tabs 23B are generally parallel and spaced apart from one another, thereby forming a gap therebetween. In the embodiment of FIGS. 2 and 3, the gap between the connector tabs 23B is opened to the rear of the vehicle. The connector tabs 23B each have a pin hole 24. The pin holes 24 are adapted to receive a pin which may attach the container 12 to the lift interface device 16 on the vehicle 18, enabling the tilting of the container 12 relative to the vehicle 18 as described hereinafter. It is also contemplated to operate the tilting maneuver solely with the use of the male connector 23, as described hereinafter.

The male connector 23 and connector tabs 23B may be anchored to an L-shaped bracket 25 (a.k.a., angle bar), for instance as an integral welded part. The bracket 25 is fixed (e.g., bolted, fastened, glued, etc) to corresponding surfaces of the container 12. This arrangement constitutes one of numerous solutions considered to secure the male connector 23 and/or connector tab(s) 23B to the receptacle portion 20.

Referring to FIGS. 2-4, the interface structure 15 is shown having an elongated body 50. The body 50 may be a casing having an interior that may enclose may motorization equipment, to power the lift interface device 16. The motorization equipment may include electric motors, battery, a transmission, gear boxes, as well as a controlling unit to operate the lift interface device 16, and a telecommunications unit (e.g., wireless) associated with a remote control, again to operate the action of the lift interface device 16. The controlling unit may be connected to sensors, such as load cells, tilt sensors, etc. In an embodiment, the interior of the body 50 receives a drawer 51, that may be pulled out of the interior of the body 50. A face of the drawer 51 may have various components, such as a voltage gauge, a battery port or like connector, a safety stop, and/or a handle, or other like components. In an embodiment, bolts may also be present to lock the drawer 51 in the closed arrangement of FIG. 3. As an alternative to the drawer 51, an access trap may be available as well to access an interior of the body 50 if the body 50 is a casing.

A pair of rails 52 may be provided in the body 50. The pair of rails 52 may be parallel to one another, and may be spaced apart by the standard distance of forks of a fork lift. In FIGS. 2-4, the rails 52 may be rectangular or square section beams connected on either side of a main part of the body 50. In another embodiment, the rails 52 may simply be non-concave elongated strips. The rails 52 may have distribution of bore 52A thereon, for example for lessening the weight of the interface structure 15 and/or to serve as escape channels for small objects, such as stones, etc, that may obstruct the coplanar connection between the forks of the vehicle 18 and the surfaces of the rails 52.

A top surface of the body 50 may or may not include a plate 53. The plate may have connection holes 53A (e.g., tapped, threaded), by which components may be fixed to the top surface of the plate 53. For example, the lift interface device 16 may be bolted to the top surface 53. A pair of guards 54 may project upwardly from the top surface of the plate 53, at the trailing end. The guards 54 may be outward of the rear end of the lift interface device 16, as in FIG. 2, to protect the lift interface device 16 from impacts. The guards 54 may also be provided as one possible embodiment of alignment guide(s) for the connection of container 12 to the lift interface device 16, as explained later. In such an arrangement, there may be a single guard 54.

The body 50 may have a low profile. For example, the top surface of the body 50, in this example defined by the plate 53, may be at a height of 13½"±1½" from the ground, so as to be displaceable into a supporting position under the container 12, via the tunnel defined by the legs 21 raising the receptacle portion 20 from the ground. Because the interface structure 15 is configured to be manipulated by the forks of the vehicle 18 while supporting a load (i.e., the lift interface device 16 and container 12), the interface structure 15 may act or be regarded as a pallet or skid. The interface structure 15 may be a structural foundation of the components it supports.

Referring now to FIGS. 1, 2, 5 and 6, the lift interface device 16 is shown in greater detail. The device 16 has a base 60, by which it is secured to the body 50 of the interface structure 15. In an embodiment, the base 60 may be a plate that may be fixed by way of releasable fasteners such as bolts, or the like. In such an embodiment, the device 16 may be a single transportable unit, that may be installed on different types of structures, including wooden pallets. According to another embodiment, the device 16 is integrally connected to the interface structure 15, and in such a case the base 60 and the plate 53 may be a single integral component. As seen in FIGS. 5 and 6, walls 61 project upwardly from the base 60. The walls 61 may define the greatest width of the lift interface device 16 from the front end to the rear end, above a plane of the base 60. Stated differently, a front end of the part of the lift interface device 16, above the plane of the base 60 and/or top surface of plate 53, has as width the spacing between the outer surfaces of the walls 61.

The base plate of the base 60 and the walls 61 may be a single bracket, or may be connected together. The walls 61 are used as a pivot base for a cylinder, as described hereinafter, and alternatives to walls may be used as well, such as a pivot block connected directly to the base. The base 60 further comprises a pivot block 62, positioned adjacent to or at a front end of the interface structure 15. The pivot block 62 may have any appropriate configuration. For instance, the pivot block 62 may be an extension of the walls 61, etc, and comprises a pivot 62A.

A pivotable frame, or simply frame, 63 is pivotally connected to the base 60, at the pivot block 62, by the pivot 62A. It will be appreciated that the base 60 of the lift interface device 16 may belong to the interface structure. In other words, the interface device 14 may include a base engageable by the vehicle (e.g., forklift) and a frame connected to the base and pivotable relative to the base; the frame engaging the container 12. Additional joints may also be provided, for instance to provide translation as well. In the illustrated embodiment, however, a single rotational degree of freedom is provided between the frame 63 and the base 60, by the pivot 62A. Therefore, the pivotable frame 63 may be in the coupling orientation shown in FIG. 2, in which the pivotable frame 63 is against the base 60 and/or against the top surface of the interface structure 15, and may be pivoted to a raised orientation, as shown in FIGS. 1 and 10, and any orientation between the coupling orientation and the raised orientation. It is pointed out that FIGS. 1 and 10 do not necessarily illustrate the maximum inclination of the frame 63 relative to the base 60. According to an embodiment, the frame 63 is movable from 0 to 62 degrees, although this range may be greater. The controller unit in the interface structure 15 may ensure that the frame 63 does not go beyond a predetermined tilt, by blocking rotation beyond a predetermined tilt. For this purpose, the controller unit may include an inclinometer or other sensors. Moreover, the controller unit may calculate a limit tilt based on the load, using a load cell to determine the weight of the loaded container 12. A higher weight may receive the permissible tilt. As another possibility, optical sensors may be present to indicate that the forks have sufficient penetrated into the rails 52.

Although the system 10 may come in different dimensions, it is considered to provide the container 12 with a width of a maximum of 36", to allow its transportation through industrial doors. For such a dimension, the interface structure 15 may have a maximum width of 29½"+0"-2". In the illustrated embodiment, the length of the interface structure 15 may be of 66"±3", and with a height of 13½"±1½" (excluding the lift interface device 16).

The frame 63 has a pair of longitudinal walls 64. In an embodiment, the walls 64 are generally vertical spaced apart to define an inner volume therebetween. The inner volume is sized to receive most other components of the lift interface device 16, as shown in FIG. 5. The walls 64 have top edges 65 (forming support surfaces for the container 12). The edges 65 are generally parallel to one another as held by transverse structural members, and lie in a plane that is generally parallel to the top surface 53 of the body 50, when the frame 63 is in the coupling configuration. Support flanks 66 project laterally from the bottom of the walls 64, and may provide additional support surface for the container 12 lifted by the device 16. The support flanks 66 may be a bent continuation of the walls 64, or may be integrally connected to the walls 64, among other possibilities. A top surface of the support flanks 66 may also be generally parallel to the top edges 65. In another embodiment, the frame 63 does not have support flanks.

The frame 63 further comprises an alignment head 67 at its front end. The alignment head 67 is illustrated as being a single bar or two bars having two longitudinal portions extending from a remainder of the frame 63, a transverse portion, and chamfer portions interrelating the longitudinal portions to the transverse portions. In other words, the alignment head 67 narrows in a forward or leading direction. The alignment head 67 will facilitate the coupling of the container 12 and vehicle 18, as will be described hereinafter. The alignment head 67 is at most as wide as the maximum width between the walls 64.

Referring to FIGS. 5 to 12, a latching mechanism M is provided for removably attaching the container 12 to the interface device 14. The latching mechanism M includes a first portion secured to the interface device 14 and a second portion secured to the container 12. A connection block 68 is provided at a tail end of the frame 63. The connection block 68 consists of various strengthening members from which projects rearwardly and upwardly a female connector, also referred to as the first portion, 69. It is understood that the latching mechanism M may be different than what is being depicted in the figures. For instance, the latching mechanism may include a substantially vertical rod and perforated tab having a aperture for slidably receiving the rod therethrough; one of the vertical rod and the perforated tab secured to the interface device 14, the other of the vertical rod and the perforated tab secured to the container 12.

Referring more particularly to FIGS. 8A to 8C, the female connector 69 may be in the form of an upwardly oriented fork defining a cavity, a channel, or a groove C for receiving the rod 23A. The channel C may be oriented at least partially vertically relative to the ground G. It will be appreciated that, alternatively, the first portion may be secured to the container 12 and the second portion may be secured to the interface device 14. The fork 69 may have two prongs or tabs, namely a leading prong 69L and a trailing prong 69T. The leading prong 69L may be located further away from the forklift than the trailing prong 69T. In other words, the leading prong 69L is closer to the container 12 than the trailing prong 69T.

As shown more clearly on FIG. 8C, the channel C has an inlet I (shown in dashed line) via which the rod 23a enters the channel C. The channel C may define a converging section C1 that extends form the inlet I. The converging section C1 may guide the rod 23a into the space between the leading and trailing prong 69L, 69T. The leading prong 69L defines a front abutment, or tooth, 69A. The front abutment 69A and may have a trapezoid shape. The tooth 69A may act as a stopper S. The tooth 69A may become in abutment against the rod 23a upon the interface device 14 in the discharging position (FIG. 10) for limiting the rod 23a to exit the channel or groove C. In the embodiment shown, the tooth 69A defines an abutment face 69G that may be oriented at least partially toward a bottom 69J of the groove C. The abutment face 69G of the tooth 69A may be substantially perpendicular to the ground G upon the interface device 14 in the discharging position for limiting a movement of the container 12 relative to the interface device 14 in the discharging position. In the embodiment shown, lateral movements of the rod 23A relative to the fork 69 may be limited by the head 23C defined at a distal end of the rod 23A; the head 23C acting as a lateral stopper.

Still referring to FIG. 8C, the front abutment 69A may have a ramp, also referred to as a guiding face, 69B facing upwardly, as shown. The guiding face 69B may be oriented at least partially away from the bottom 69J of the groove C.

The guiding face 69B is opposite the abutment face 69G and slopes toward the trailing prong 69T and toward the bottom 69J of the groove C. The leading prong 69L defines a depression 69C between a tip of the tooth 69A and the bottom 69J of the groove C. The depression 69C may be lower than the front abutment 69A. In the embodiment shown, the trailing prong 69T defines a second guiding face 69D, also referred to as a ramp. The second guiding face 69D may slope toward the leading prong 69L and toward the bottom 69J of the groove C. The guiding faces 69B, 69D may help in directing the rod 23a into the groove C and past the tooth 69A. In an embodiment, the connector 69 may not be a female-type connector, as the fork configuration may not be required. The connector 69 may have a single prong, such as the one featuring the front abutment 69A. Moreover, although the front abutment 69A may be a projection, it may also be the result of the presence of the depression 69C.

The connection block 68 may further include a connector tab 69E, with pin hole 69F, for connection with the connector tabs 23B of the container 12. The connection block 68 also serves as a pivot support for a cylinder 71 of an actuation unit 70, for a pivot 72. It is observed that an axis of the pivot 72 may be above a plane of the top edges 65, as illustrated in FIG. 5. Suitable dimensions for the lift interface device 16 are a height of 6¼"±1", a width of 8⅞"±1" for the frame 63 (for a ratio of 2.78 and 3.75 for a width of the interface structure 15 on a width of the frame 63), and a length of 52"±3" for the top edges 65, in support of the dimensions provided above for the interface structure 15. Hence, the top height of the interface apparatus 14 with the lift interface device 16 in its coupling orientation may be slightly below 20" (at 19¾"±2½").

The actuation unit 70 may be disposed between the frame 63 and the base 60 (or between the lift interface device 16 and the interface structure 15) and is operable to pivot the frame 63 relative to the base 60. The actuation unit 70 is shown as a linear actuator which may be an electric unit, an electromechanical unit, or an hydraulic unit that may comprise the necessary hydraulic equipment to actuate the cylinder 71, including an hydraulic pump, manifold, valves, and fluid lines, most of which may be lodged in the inner volume of the frame 63, and/or in the body 50 of the interface structure 15. The cylinder 71 is a telescopic cylinder, but may be any other type of cylinder such as a standard shaft-and-housing piston cylinder, a linear actuator, etc, as a function of loads for which the system 10 is specified. Although the unit 70 is described as being hydraulic, any other appropriate type of actuation may be used, such as electrical or pneumatic actuation, or manually-operated hydraulics. Moreover, the unit 70 may be operated using the power source and controller commands of the interface structure 15, with a remote control that may be used to operate the interface apparatus 14 and actuate the cylinder 71, for instance from an occupant of the vehicle 18.

Therefore, in operation, the containers 12 may be provided as a set or kit with a single one of the interface apparatus 14 to move the containers 12 around, using a fork lift 18. The container 12 is shown in FIG. 1 as being useable for instance to receive materials. More specifically, the frequency at which the containers 12 must be maneuvered may be relatively low, whereby institutional use may be of a shared interface apparatus 14 for numerous containers 12. The use of the interface apparatus 14 is therefore maximized by being shared with a kit of containers 12. In other words, a kit K may include the container 12 and the interface device 14.

Figure 7B:
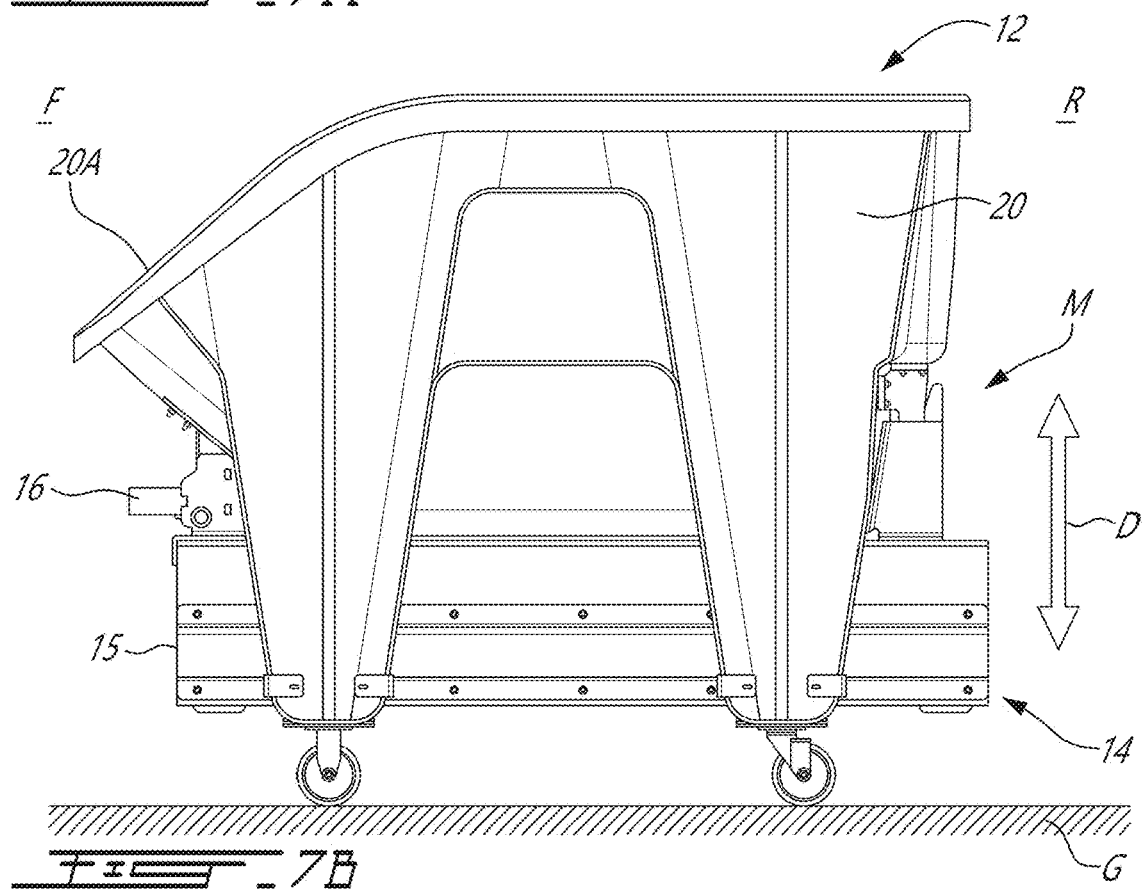
FIG. 7B is a side view showing the interface apparatus being raised from under the container.

Referring to FIGS. 7A and 7B, there is shown how the interface apparatus 14 is inserted under the container 12. In order for the interface apparatus 14 to be coupled to the container 12, the lift interface device 16 must be in the coupling orientation (e.g., FIG. 2). The interface apparatus 14 is moved in the forward direction F toward a rear/tail end of the container 12 by a forklift 18 (not shown in FIGS. 7A and 7B), with the body 50 aligned with the tunnel of the container 12. In an embodiment, the interface apparatus 14 and the container 12 may not be perfectly aligned.

Once the interface apparatus 14 is advanced to the position of FIG. 7A, it is raised as shown in FIG. 7B. It is pointed out that the channel 22 has slightly larger sectional dimensions than the frame 63, the play therebetween enabling self-alignment when the interface apparatus 14 is raised as in FIGS. 7A and 7B, for instance with the container 20 rolling to alignment.

For the interface apparatus 14 to be aligned for being raised, the male connector 23 is in a vertical line relative to the female connector 69, as best shown in FIG. 8A. This may be achieved by the guidance of the guard(s) 54, which may be positioned on the interface apparatus 14 so as to be indicate of an alignment between the connectors 23 and 69. This is one possible embodiment for ensuring the vertical alignment. As the female connector 69 is raised, the rod, also referred to as the second portion of the latching mechanism M, 23A penetrates the female connector 69. The ramps 69B and/or 69D may guide the rod 23A into the female connector 69, until the point is reached where the rod 23A is below the front abutment 69A and/or the rod 23A is at the same height as the depression 69C. At that point, the container 12 may be further raised as in FIG. 9 and tilted as in FIG. 10. When the container 12 is tilted, the collaboration between the front abutment 69A and the rod 23A ensures that the container 12 remains on the lift interface device 16. Moreover, the head on the rod 23A avoids a lateral detachment of the rod 23A from its captive engagement in the female connector 69. It is observed that that the sequence of connection as in FIGS. 8A and 8B occurs simply by maneuvering of the interface apparatus 14 via the fork lift 18, and without the need for manual intervention. The controller unit has various sensors to then ensure that the container 12 is not tilted beyond a given orientation and/or to ensure that the container 12 is well supported by the interface apparatus 14.

Referring to FIGS. 1 and 8A-8B, as another possible feature, the connector tab 69E of the device 16 may aligned with the connector tabs 23B of the container 12. A pin may then be inserted in the aligned apertures or holes 24 and 69F. The pin should be sized so as to enable manual insertion into the holes 24 and 69F of the connector tabs 23B and 69E, respectively, while being snuggly received (with little play) relative to a surface of the holes 24, 69F. It is considered to provide temporary locking system such as plugs to block to the free ends of the pins 80. In other words, each of the frame 63 and the container 12 defines an aperture 24, 69F that may be in register upon the latching mechanism M in the engaged configuration (FIG. 8B); a pin being insertable through the registered apertures 24, 69F for locking the container 12 to the interface device 14.

If it is desired to tilt the container 12 (e.g., as in FIG. 10), the cylinder 71 is actuated. The tilt angle of the container 12 is augmented by increasing the length of the cylinder 71.

To decouple the container 12 from the interface apparatus 14, the frame 63 is pivoted to its coupling position (FIG. 2), the vehicle 18 lowers the interface apparatus 14 to the position of FIG. 7A, at which point the male connector 23 and female connector 29 are separated from one another, as in FIG. 8A. The vehicle 18 may then be displaced in the rearward direction, i.e., backed away from the container 12.

Referring to FIGS. 7A, 7B, and 8A to 8C, the latching mechanism M has a disengaged configuration (FIGS. 7A and 8A) and an engaged configuration (FIGS. 7B and 8B). The latching mechanism M may move from the disengaged configuration to the engaged configuration with a movement of the interface device 14 and the container 12 in a mating direction D. The mating direction D may have a component normal to the ground G. In the embodiment shown, the mating direction D is substantially perpendicular to the ground G. The mating direction D corresponds to a direction via which the first and second portion of the latching mechanism M, herein the rod 23a and the fork 69, may become engaged/disengaged to/from one another.

As mentioned previously, the container 12 may have a standard hopper shape, but may also be a low profile hopper shape, a pallet style base. The system 10 may conveniently bring heavy tools to a construction site. For instance, the container 12 may be a table upon which a piece of equipment is permanently installed.

In an embodiment, the interface apparatus 14 is self-powered, in that it does not need to be connected to a vehicle or separate power source to operate. In an embodiment, the interface apparatus receives commands from a remote control or wireless device or wired device. This is a command signal only, i.e., not a power supply.

Therefore, the system 10 of the container 12 and interface apparatus 14 includes an interface connector, such as 69, at a trailing end of the device 16, adapted to be used for releasably connecting the container 12 to the frame 63 when the frame 63 is rotated toward the raised configuration. The interface connector has a portion located closer to the leading end than a portion of the container connector 23 to block movement of the container 12 when the frame 63 is rotated away from the coupling orientation.

Referring to all figures, for operating the interface apparatus 14, the vehicle (e.g., forklift) is coupled to the base 15 of the interface apparatus 14; the frame 63 is locked to the container 12 by lifting the interface apparatus 14 off the ground G; and a content of the container 12 is discharged by pivoting the frame 63 and the container 12 secured thereto relative to the base 15.

As shown in FIGS. 9-10, both of the container 12 and the interface apparatus 14 are lifted off the ground before discharging the content of the container 12. In the embodiment shown, coupling the vehicle 18 includes inserting each of two forks of the vehicle 18 in a respective one of rails 52 defined by the base 60 of the interface apparatus 14. In the embodiment shown in FIGS. 8A-8B, locking the frame 63 to the container 12 includes inserting a rod 23A defined by one of the frame 63 and the container 12 into the groove C defined by the other of the frame 63 and the container 12. Discharging the content of the container 12 includes blocking the rod 23A within the groove C. Locking the frame 63 to the container 12 may include limiting lateral movements of the container 12 relative to the interface apparatus 14. Once the container 12 is discharged, the frame 63 may be disengaged from the container 12.

As shown more clearly in FIGS. 8A-8B, the rod 23A may be guided out of the groove C while disengaging the frame 63 from the container 12. Disengaging the frame 63 from the container 12 may include moving the interface apparatus 14 relative to the container 12 toward the ground G. 10. Moving the interface apparatus 14 relative to the container 12 includes laying the container 12 on the ground G and moving the interface apparatus 14 toward the ground G.

Embodiments disclosed herein include:

A. An interface apparatus for coupling a vehicle to a container, comprising: a base engageable by the vehicle; a frame connected to the base and detachably securable to the container, the frame pivotable relative to the base for pivoting the container from a lifting position for maintaining the container leveled relative to a ground to a discharging position in which the container is angled relative to the ground for discharging the container; an actuation unit between the frame and the base for pivoting the frame relative to the base; and a latching mechanism for removably attaching the container to the apparatus, the latching mechanism including a first portion secured to the frame and a second portion securable to the container, the first portion movable relative to the second portion in a mating direction having a component normal to the ground from a disengaged configuration in which the first portion is detached form the second portion to an engaged configuration in which the first portion is received within the second portion.

B. A kit comprising: a container defining an engagement surface facing a ground; and an interface apparatus having a base engageable by a vehicle for lifting the interface apparatus and the container off the ground, a frame connected to the base and detachably securable to the container, the frame abuttable against the engagement surface of the container, the frame pivotable relative to the base from a lifting position in which the container is leveled relative to the ground to a discharging position in which the container is angled relative to the ground for discharging the container, an actuation unit engaged to the frame and the base for pivoting the frame relative to the base, and a latching mechanism for removably attaching the container to the apparatus, the latching mechanism including a first portion secured to the frame and a second portion defined by the container, the first portion movable relative to the second portion in a mating direction having a component normal to the ground from a disengaged configuration in which the first portion is detached form the second portion to an engaged configuration in which the first portion is received within the second portion.

Embodiments A and B may include any of the following elements, in any combinations:

Element 1: one of the first portion and the second portion defines a channel for receiving the other of the first portion and the second portion, the channel being oriented at least partially vertically relative to the ground. Element 2: the channel defines an inlet for receiving the other of the first portion and the second portion, the channel defining a converging section extending form the inlet for guiding the other of the first portion and the second portion from the disengaged configuration to the engaged configuration. Element 3: one of the first portion and the second portion defines a stopper in abutment against the other of the first portion and the second portion in the discharging position. Element 4: the first portion has two prongs defining a groove therebetween, the groove having an opening oriented away from the ground, and wherein the second portion is a rod extending perpendicularly to the groove and slidingly receivable within the groove in the mating direction. Element 5: a lateral stopper is secured to a distal end of the rod, the stopper defining an abutment face, the abutment face being abuttable against one or more of the two prongs in the engaged configuration of the latching mechanism. Element 6: the two prongs include a leading prong and an trailing prong, a tooth defined by the leading prong and protruding toward the trailing prong, the tooth defining a tooth abutment face oriented at least partially toward a bottom of the groove. Element 7: the tooth abutment face is substantially perpendicular to the ground upon the frame being in the discharging position for limiting movements of the container relative to the frame in the discharging position. Element 8: the tooth defines a guiding face opposite the abutment face, the guiding face sloping toward the trailing prong and toward the bottom of the groove. Element 9: the trailing prong defines a second guiding face sloping toward the leading prong and toward the bottom of the groove. Element 10: the actuation unit is a linear actuator. Element 11: each of the frame and the container defines an aperture, the apertures being in register upon the locking mechanism in the engaged configuration, a pin removably insertable through both of the apertures to lock the frame to the container.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. An interface apparatus for coupling a vehicle to a container, comprising: a base engageable by the vehicle; a frame connected to the base and detachably securable to the container, the frame pivotable relative to the base for pivoting the container from a lifting position for maintaining the container leveled relative to a horizontal level ground to a discharging position in which the container is angled relative to the horizontal level ground for discharging the container; an actuation unit between the frame and the base for pivoting the frame relative to the base; and a latching mechanism for removably attaching the container to the apparatus, the latching mechanism including a first portion secured to the frame and a second portion securable to the container, the first portion movable relative to the second portion in a mating direction being substantially normal to the horizontal level ground from a disengaged configuration in which the first portion is detached from the second portion to an engaged configuration in which the first portion is engaged with the second portion via a movement of the frame relative to the container, the movement being substantially vertical to the horizontal level ground.

2. The interface apparatus of claim 1, wherein one of the first portion and the second portion defines a channel for receiving the other of the first portion and the second portion, the channel being oriented at least partially vertically relative to the horizontal level ground.

3. The interface apparatus of claim 2, wherein the channel defines an inlet for receiving the other of the first portion and the second portion, the channel defining a converging section extending from the inlet for guiding the other of the first portion and the second portion from the disengaged configuration to the engaged configuration.

4. The interface apparatus of claim 1, wherein one of the first portion and the second portion defines a stopper in abutment against the other of the first portion and the second portion in the discharging position.

5. The interface apparatus of claim 1, wherein the first portion has two prongs defining a groove therebetween, the groove having an opening oriented away from the ground, and wherein the second portion is a rod extending perpendicularly to the groove and slidingly receivable within the groove in the mating direction.

6. The interface apparatus of claim 5, wherein a lateral stopper is secured to a distal end of the rod, the stopper defining an abutment face, the abutment face being abuttable against one or more of the two prongs in the engaged configuration of the latching mechanism.

7. The interface apparatus of claim 5, wherein the two prongs include a leading prong and a trailing prong, a tooth defined by the leading prong and protruding toward the trailing prong, the tooth defining a tooth abutment face oriented at least partially toward a bottom of the groove.

8. The interface apparatus of claim 7, wherein the tooth abutment face is substantially perpendicular to the ground upon the frame being in the discharging position for limiting movements of the container relative to the frame in the discharging position.

9. The interface apparatus of claim 7, wherein the tooth defines a guiding face opposite the abutment face, the guiding face sloping toward the trailing prong and toward the bottom of the groove.

10. The interface apparatus of claim 9, wherein the trailing prong defines a second guiding face sloping toward the leading prong and toward the bottom of the groove.

11. The interface apparatus of claim 1, wherein the actuation unit is a linear actuator.

12. The interface apparatus of claim 1, wherein each of the frame and the container defines an aperture, the apertures being in register upon the first portion being received within the second portion in the engaged configuration, a pin removably insertable through both of the apertures to lock the frame to the container.

13. A kit comprising: a container defining an engagement surface facing a ground; and an interface apparatus having a base engageable by a vehicle for lifting the interface apparatus and the container off the ground, a frame connected to the base and detachably securable to the container, the frame abuttable against the engagement surface of the container, the frame pivotable relative to the base from a lifting position in which the container is leveled relative to a horizontal level ground to a discharging position in which the container is angled relative to the horizontal level ground for discharging the container, an actuation unit engaged to the frame and the base for pivoting the frame relative to the base, and a latching mechanism for removably attaching the container to the apparatus, the latching mechanism including a first portion secured to the frame and a second portion defined by the container, the first portion movable relative to the second portion in a mating direction being substantially normal to the horizontal level ground from a disengaged configuration in which the first portion is detached from the second portion to an engaged configuration in which the first portion is engaged with the second portion via a movement of the frame relative to the container, the movement being substantially vertical to the horizontal level ground.

14. The kit of claim 13, wherein one of the first portion and the second portion defines a channel for receiving the other of the first portion and the second portion, the channel being oriented at least partially vertically relative to the horizontal level ground.

15. The kit of claim 14, wherein the channel defines an inlet for receiving the other of the first portion and the second portion, the channel defining a converging section extending from the inlet for guiding the other of the first portion and the second portion from the disengaged configuration to the engaged configuration.

16. The kit of claim 13, wherein one of the first portion and the second portion defines a stopper in abutment against the other of the first portion and the second portion in the discharging position.

17. The kit of claim 13, wherein the first portion has two prongs defining a groove therebetween, the groove having an opening oriented away from the ground, and wherein the second portion is a rod extending perpendicularly to the groove and slidingly receivable within the groove in the mating direction.

18. The kit of claim 17, wherein a lateral stopper is secured to a distal end of the rod, the stopper defining an abutment face, the abutment face being abuttable against one or more of the two prongs in the engaged configuration of the latching mechanism.

19. The kit of claim 17, wherein the two prongs include a leading prong and a trailing prong, a tooth protruding from the leading prong toward the trailing prong, the tooth defining a tooth abutment face oriented at least partially toward a bottom of the groove.

20. The kit of claim 13, wherein the actuation unit is a linear actuator.

21. The kit of claim 13, wherein each of the frame and the container defines an aperture, the apertures being in register upon the first portion being received within the second portion in the engaged configuration, a pin removably insertable through both of the apertures to lock the frame to the container.

* * * * *